United States Patent
Steffes et al.

(10) Patent No.: US 11,628,772 B2
(45) Date of Patent: Apr. 18, 2023

(54) POWERFOLD ACTUATOR FOR EXTERIOR MIRROR

(71) Applicant: Magna Mirrors of America, Inc., Holland, MI (US)

(72) Inventors: Matthew V. Steffes, Kentwood, MI (US); Mitchell J. Wesley, Wyoming, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 0 days.

(21) Appl. No.: 17/452,414

(22) Filed: Oct. 27, 2021

(65) Prior Publication Data
US 2022/0126751 A1    Apr. 28, 2022

Related U.S. Application Data

(60) Provisional application No. 63/106,421, filed on Oct. 28, 2020.

(51) Int. Cl.
*B60R 1/074*      (2006.01)
*G02B 7/182*      (2021.01)

(52) U.S. Cl.
CPC .............. *B60R 1/074* (2013.01); *G02B 7/182* (2013.01)

(58) Field of Classification Search
CPC ................................ B60R 1/074; G02B 7/182
USPC .................................................. 359/841, 877
See application file for complete search history.

(56) References Cited

U.S. PATENT DOCUMENTS

| | | | |
|---|---|---|---|
| 5,636,071 A | 6/1997 | Mochizuki et al. | |
| 6,022,113 A * | 2/2000 | Stolpe | B60R 1/074 359/872 |
| 6,130,514 A * | 10/2000 | Oesterholt | B60R 1/074 359/872 |
| 6,133,704 A | 10/2000 | Yoshida et al. | |
| 6,322,221 B1 | 11/2001 | van de Loo | |
| 6,322,721 B1 | 11/2001 | van de Loo | |
| 6,390,630 B1 | 5/2002 | Ochs | |
| 6,578,973 B2 | 6/2003 | Apfelbeck | |
| 6,874,896 B2 | 4/2005 | Yoshida | |
| 6,926,414 B2 | 8/2005 | Van Stiphout | |
| 6,981,774 B2 | 1/2006 | Dumont et al. | |
| 7,008,068 B2 | 3/2006 | Yoshida | |
| 7,070,287 B2 | 7/2006 | Foote et al. | |
| 7,171,726 B2 | 2/2007 | Kleissen et al. | |
| 7,255,451 B2 | 8/2007 | McCabe et al. | |
| 7,289,037 B2 | 10/2007 | Uken et al. | |

(Continued)

*Primary Examiner* — Ricky D Shafer
(74) *Attorney, Agent, or Firm* — Honigman LLP

(57) ABSTRACT

A vehicular exterior rearview mirror assembly includes a powerfold actuator electrically operable to pivot a mirror head relative to a mounting base. The actuator includes a biasing element disposed between an upper housing and an upper end of a pivot tube and releasably retains the powerfold actuator in at least one detent state. An upper detent is disposed radially outboard of the pivot tube and radially inboard of an output gear and a lower detent, and the upper detent includes a detent lip that engages an upper detent surface of the lower detent. When the actuator is in a primary detent state, a spring load path of the biasing element is through the output gear and lower detent to the base. When the actuator is in a secondary detent state, the spring load path is through the detent lip of the upper detent and lower detent to the base.

24 Claims, 14 Drawing Sheets

(56) References Cited

U.S. PATENT DOCUMENTS

| | | |
|---|---|---|
| 7,360,932 B2 | 4/2008 | Uken et al. |
| 7,374,299 B2 | 5/2008 | Brouwer et al. |
| 7,392,567 B2 | 7/2008 | Brouwer |
| 7,452,088 B2 | 11/2008 | Brester et al. |
| 7,490,945 B2 | 2/2009 | Proctor |
| 7,533,997 B2 | 5/2009 | Onuki |
| 7,543,949 B2 | 6/2009 | van den Brink et al. |
| 7,547,855 B2 * | 6/2009 | Brouwer ................. B60R 1/074 |
| | | 200/405 |
| 7,572,018 B2 | 8/2009 | Errando Smet et al. |
| 7,628,499 B2 | 12/2009 | Brouwer et al. |
| 7,744,229 B2 | 6/2010 | Oehmann et al. |
| 7,836,553 B2 | 11/2010 | Brouwer et al. |
| 7,887,202 B1 | 2/2011 | Peterson |
| 8,049,640 B2 | 11/2011 | Uken et al. |
| 8,129,642 B2 | 3/2012 | Brouwer et al. |
| 8,201,305 B2 | 6/2012 | Brouwer et al. |
| 8,277,059 B2 | 10/2012 | McCabe et al. |
| 8,313,202 B2 | 11/2012 | van Stiphout et al. |
| 8,366,284 B2 | 2/2013 | Flynn et al. |
| 8,508,831 B2 | 8/2013 | De Wind et al. |
| 8,529,108 B2 | 9/2013 | Uken et al. |
| 8,628,200 B2 | 1/2014 | van Stiphout et al. |
| 8,730,553 B2 | 5/2014 | De Wind et al. |
| 8,915,601 B2 | 12/2014 | Foote et al. |
| 9,033,526 B2 | 5/2015 | Schuurmans et al. |
| 9,045,088 B2 * | 6/2015 | Sakata .................... B60R 1/074 |
| 9,067,541 B2 * | 6/2015 | Sobecki .................. B60R 1/074 |
| 9,174,578 B2 | 11/2015 | Uken et al. |
| 9,242,606 B2 | 1/2016 | Mambourg |
| 9,346,403 B2 | 5/2016 | Uken et al. |
| 9,487,142 B2 | 11/2016 | Sobecki et al. |
| 9,598,016 B2 | 3/2017 | Blank et al. |
| 9,758,100 B2 | 9/2017 | Mendoza Vicioso et al. |
| 9,827,913 B2 | 11/2017 | De Wind et al. |
| 9,987,987 B2 | 6/2018 | van Stiphout et al. |
| 10,099,618 B2 | 10/2018 | Foote et al. |
| 10,940,801 B1 | 3/2021 | Harris et al. |
| 11,173,843 B2 * | 11/2021 | Peterson ................. B60R 1/074 |
| 11,214,198 B2 * | 1/2022 | Harris .................... B60R 1/074 |
| 11,396,264 B2 * | 7/2022 | Peterson ................. B60R 1/074 |
| 2002/0135905 A1 | 9/2002 | Yoshida |
| 2003/0218812 A1 | 11/2003 | Foote et al. |
| 2004/0196578 A1 | 10/2004 | Dumont et al. |
| 2004/0218296 A1 | 11/2004 | Van Stiphout |
| 2005/0000058 A1 | 1/2005 | Kleissen et al. |
| 2005/0134979 A1 | 6/2005 | Yoshida |
| 2005/0141111 A1 | 6/2005 | Yoshida |
| 2006/0103957 A1 | 5/2006 | Olijnyk et al. |
| 2006/0274442 A1 | 12/2006 | Brouwer et al. |
| 2007/0029179 A1 * | 2/2007 | Brouwer ................. B60R 1/074 |
| | | 200/329 |
| 2007/0084707 A1 * | 4/2007 | van den Brink ........ B60R 1/074 |
| | | 359/877 |
| 2007/0211356 A1 | 9/2007 | Brester et al. |
| 2008/0168623 A1 | 7/2008 | Brouwer et al. |
| 2009/0237820 A1 | 9/2009 | McCabe et al. |
| 2009/0303625 A1 | 12/2009 | van Stiphout et al. |
| 2010/0238570 A1 | 9/2010 | Reedman et al. |
| 2010/0275411 A1 | 11/2010 | Brouwer |
| 2012/0067497 A1 | 3/2012 | Hansel et al. |
| 2013/0321941 A1 | 12/2013 | van Stiphout et al. |
| 2017/0088054 A1 | 3/2017 | Casals et al. |
| 2018/0345862 A1 | 12/2018 | van Stiphout |
| 2019/0092241 A1 * | 3/2019 | Fujisaki .................. B60R 1/074 |
| 2020/0223364 A1 | 7/2020 | Peterson et al. |
| 2021/0261053 A1 | 8/2021 | Peterson et al. |
| 2022/0073001 A1 * | 3/2022 | Peterson ................. B60R 1/074 |
| 2022/0355736 A1 * | 11/2022 | Peterson ................. B60R 1/074 |

* cited by examiner

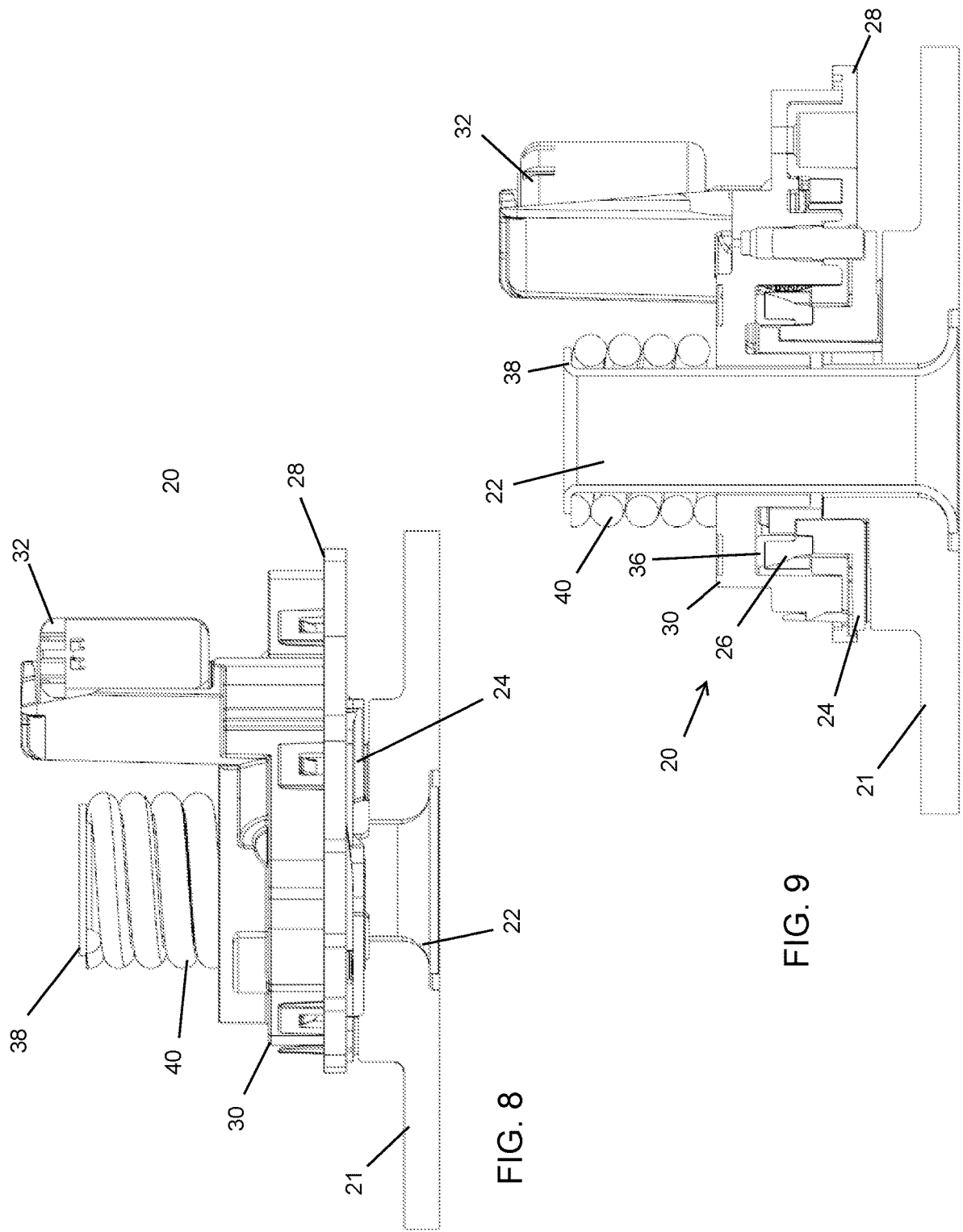

*Primary Detent*
Load Path: Housing -> output gear -> detent plate -> base.
Upper detent is "floating"

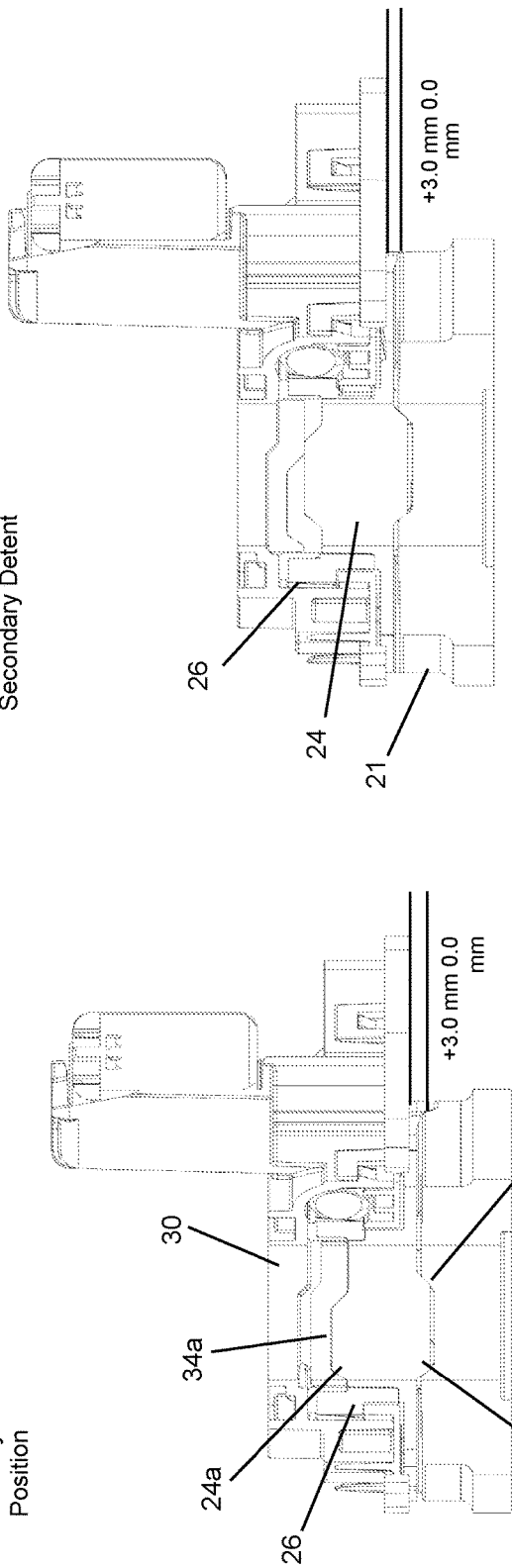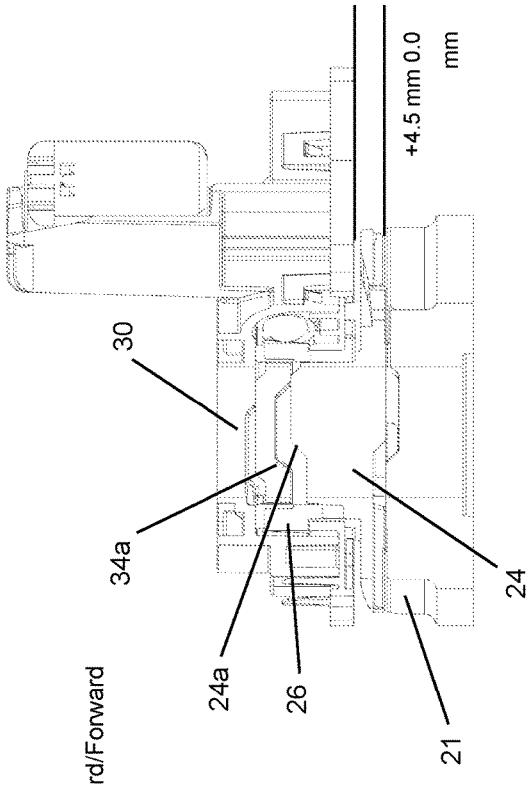

*Secondary Detent*
Load Path: Housing -> upper detent -> detent plate -> base. Output gear is "floating"

POWERFOLD ACTUATOR FOR EXTERIOR MIRROR

CROSS REFERENCE TO RELATED APPLICATION

The present application claims the filing benefits of U.S. provisional application Ser. No. 63/106,421, filed Oct. 28, 2020, which is hereby incorporated herein by reference in its entirety.

FIELD OF THE INVENTION

The present invention relates generally to the field of exterior rearview mirror assemblies for vehicles and, more particularly, to the field of powerfold exterior rearview mirror assemblies.

BACKGROUND OF THE INVENTION

It is known to provide an automotive exterior rearview mirror assembly that includes a foldable mirror assembly, such as a powerfold mirror where the mirror head is pivotable via an actuator between a drive or use position and a folded or park position.

SUMMARY OF THE INVENTION

A rearview mirror assembly (such as an exterior mirror assembly mounted at a side of an equipped vehicle) includes a powerfold actuator system that pivots the mirror head of the mirror assembly between a drive or use position and a folded or park position, such as responsive to a user input. The powerfold actuator may include a pair of drive motors and thus may provide enhanced or greater output torque, such that the actuator is suitable for large SUV or pickup truck exterior mirror applications, and may be suitable for larger trailer tow mirror applications. The powerfold actuator includes a primary detent assembly that functions to retain the mirror head at the drive position or park position, and also includes a separate secondary detent assembly that functions to retain the mirror head at the drive position when the mirror head, after powered folding to the folded position, is manually pivoted from the folded position to the drive position. During operation of the powerfold actuator, the actuator functions to lift the mirror head relative to the mounting base (at the vehicle) so that there are reduced forces and reduced friction at the cut line seal that is disposed between the mirror head and the mounting base.

These and other objects, advantages, purposes and features of the present invention will become apparent upon review of the following specification in conjunction with the drawings.

BRIEF DESCRIPTION OF THE DRAWINGS

FIG. 8 is a side elevation of the powerfold actuator of FIG. 7;

FIG. 9 is a sectional view of the powerfold actuator of FIG. 7, shown with the upper detent removed;

FIG. 13 is another side view of the powerfold actuator of FIG. 10;

FIG. 17 is another side view of the powerfold actuator of FIG. 14;

FIG. 18 is another side view of the powerfold actuator, shown when the mirror head has been manually pivoted;

DESCRIPTION OF THE PREFERRED EMBODIMENTS

Figure 1:
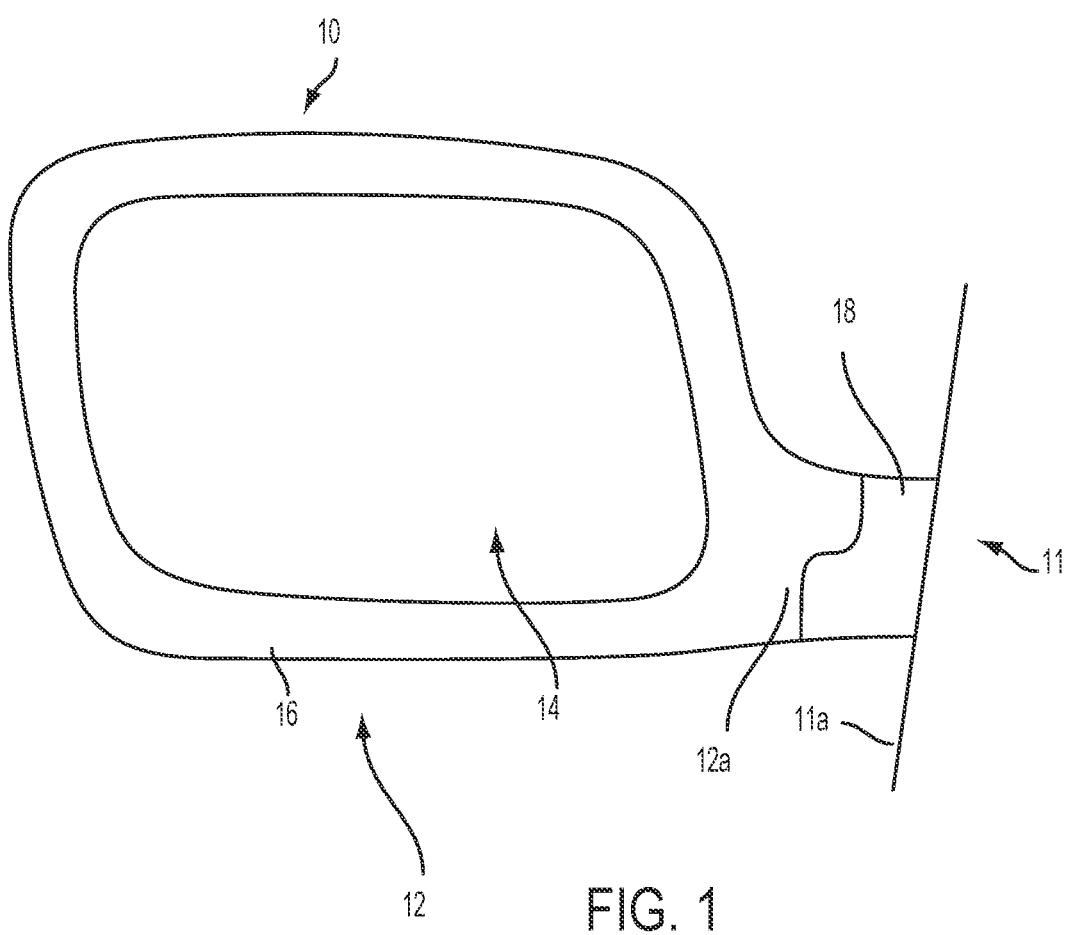
FIG. 1 is a front plan view of an exterior rearview mirror assembly pivotally attached at a mounting base at a side of a vehicle.

Referring now to the drawings and the illustrative embodiments depicted therein, an exterior rearview mirror assembly 10 for a vehicle 11 includes a mirror head 12 that includes a mirror reflective element 14 received in and/or supported at or by a mirror shell or casing 16 of the mirror head portion 12 (FIG. 1). The mirror head portion 12 includes a mounting portion 12a that is pivotally or movably mounted to a mounting arm or base or portion 18. The mirror assembly 10 comprises a powerfold mirror (where the mirror head portion may be pivoted via an actuator assembly or adjustment device), and may comprise a breakaway mirror (where the mirror head portion may be manually pivoted about the mounting arm or base). The mounting arm or base 18 of mirror assembly 10 is mounted at the side 11a of a host or subject vehicle 11 equipped with the mirror assembly 10, with the reflective element 14 providing a rearward field of view along the respective side of the vehicle to the driver of the vehicle, as discussed below.

Figure 3:
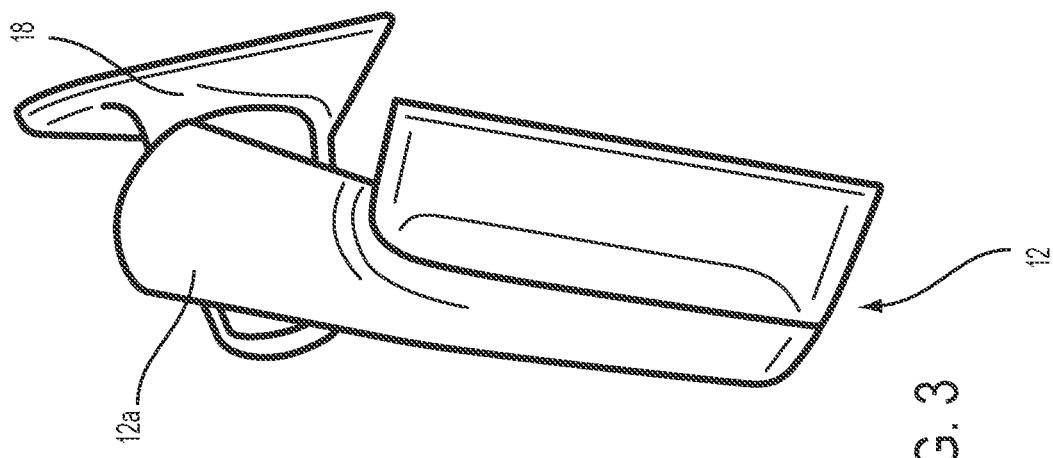
FIG. 3 is a top plan view of the exterior mirror assembly, with the mirror head pivoted to a folded or non-use position.
Figure 2:
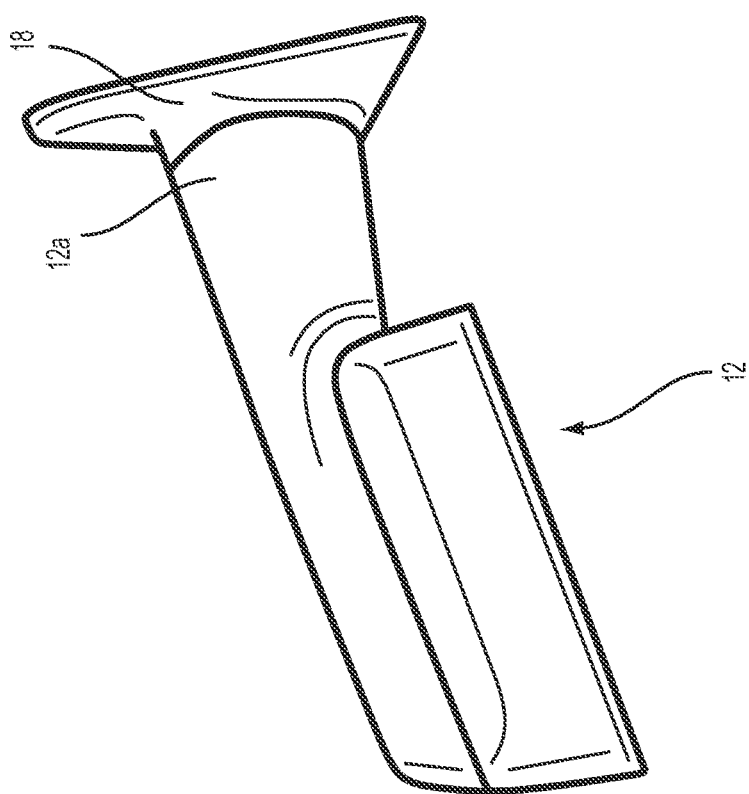
FIG. 2 is a top plan view of the exterior mirror assembly, with the mirror head pivoted to a drive or use position.
Figure 5:
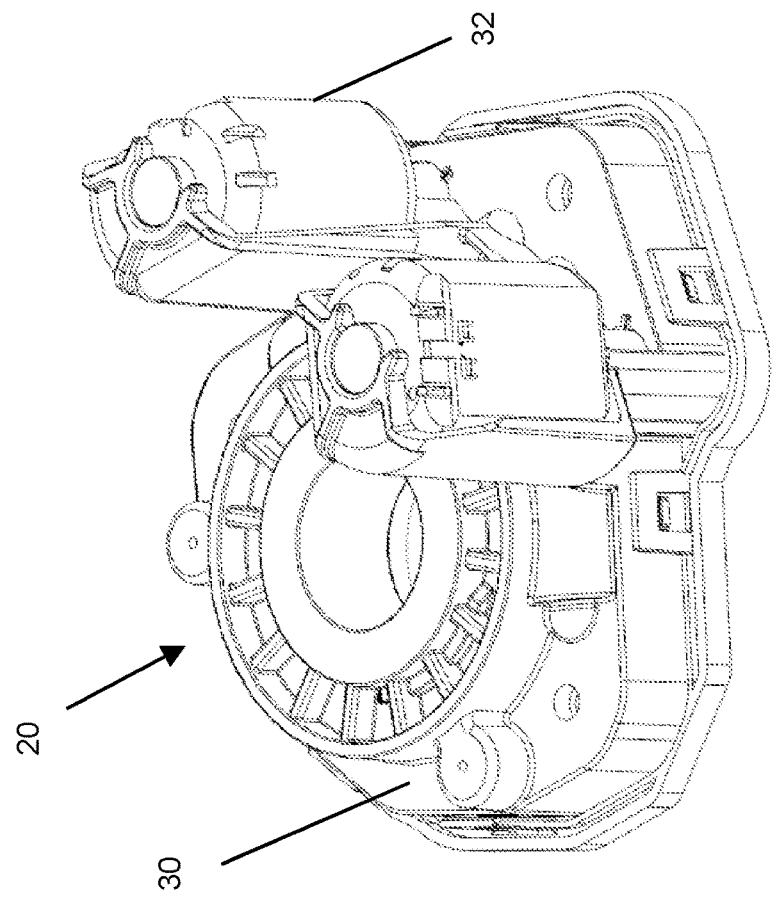
FIGS. 4 and 5 are views of a powerfold actuator of the exterior mirror assembly of FIGS. 1-3.
Figure 4:
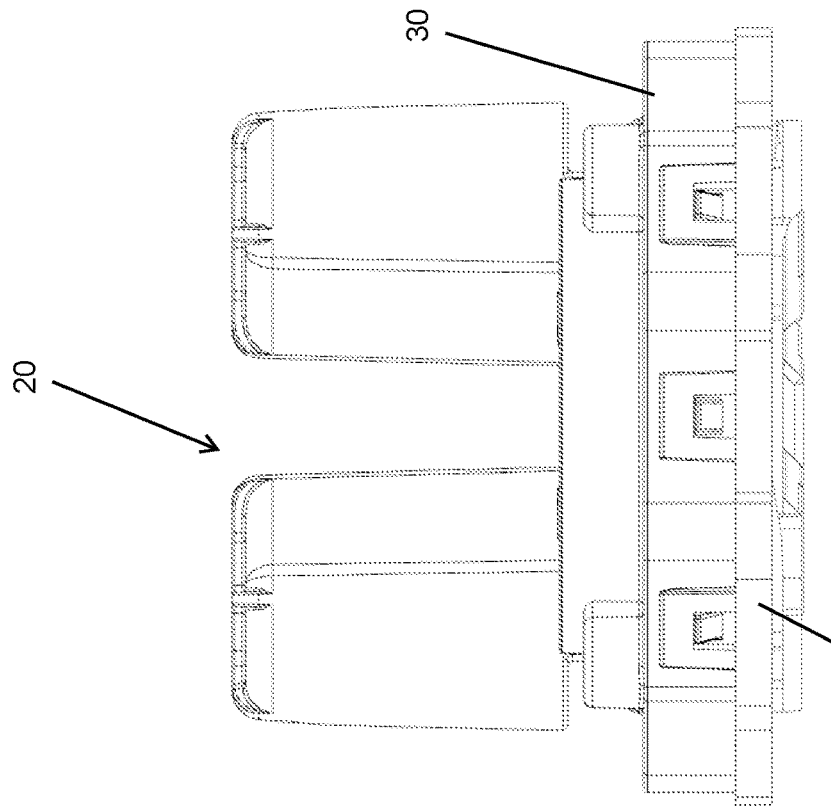
Figure 6:
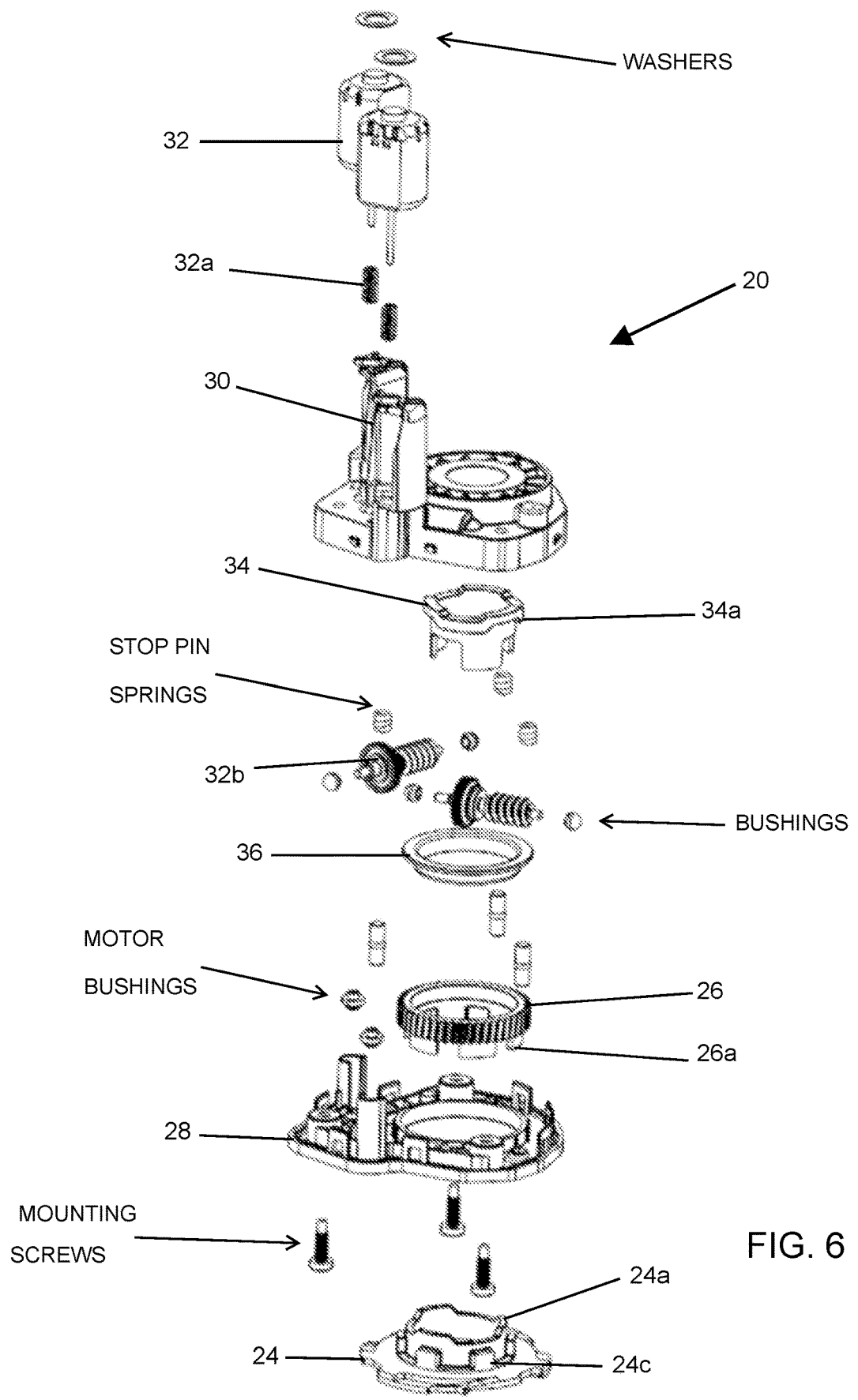
FIG. 6 is an exploded view of the powerfold actuator.

The powerfold mirror assembly 10 includes an actuator 20 that is operable to pivot the mirror head 12 (comprising the mirror casing 16 and reflective element 14) relative to the mounting arm or base 18. The actuator 20 operates, such as responsive to a user input, to pivot the mirror head 12 between a plurality of detent positions, including a use or drive position (FIG. 2) and a folded or park position (FIG. 3). The mirror head is also pivotable manually to either the use or folded position. The actuator may pivot the mirror head 12 between the drive position and the folded position responsive to the user input, or the actuator may pivot the mirror head automatically, such as upon completion of performance of a parking maneuver of the vehicle or upon locking or unlocking of the doors of the vehicle.

When in the use or drive position, the mirror head 12 is extended from the side of the vehicle so as to provide the rearward field of view along the side of the vehicle to the driver of the vehicle. When in the folded or park position, the mirror head 12 is folded or pivoted or rotated from the extended position toward the side of the vehicle, such that the mirror reflective element 14 may be facing the side of the vehicle and does not provide the rearward field of view along the side of the vehicle. Optionally, the mirror head may also be pivoted to a fully forward position, where the mirror head 12 is folded or pivoted or rotated away from the folded position and beyond the use position, such that the mirror reflective element 14 may face sideward or forward away from the vehicle. The mirror head 12 may pivot toward the fully forward position manually, such as upon contact or a collision with an object. A seal may be disposed along the interface between the mounting portion 12a of the mirror head 12 and the mounting arm or base 18, such as to reduce noise or damage from vibration of the mirror head 12 relative to the mounting base 18 and/or to preclude moisture or debris from entering the mirror head 12 or mounting base 18. The actuator may utilize aspects of the actuators described in U.S. Pat. Nos. 7,887,202 and/or 9,487,142, and/or International Publication No. WO 2019/035078, and/or U.S. Publication No. US-2021-0261053, which are all hereby incorporated herein by reference in their entireties.

As shown in FIGS. 4-9, the mirror actuator 20 comprises a pivot assembly that has a base post construction that is fixedly disposed at or attached at the mounting base 18 and that has a pivot tube or post 22 and a base 21 integrated together (or that has a separate base and pivot post joined together) with the pivot post 22 providing or defining a pivot axis for the mirror head 12. The post 22 extends from the base 21 and extends through a lower detent plate 24 and an output gear 26 that are disposed at the post 22 and that are keyed together and non-rotatable relative to one another but rotatable relative to the post 22 and the base 21 when the mirror head 12 is manually pivoted, as discussed below.

An actuator housing or bracket (comprising a lower housing 28 and an upper housing 30) is rotatably disposed at the post 22 and houses a pair of motors 32. The actuator housing is non-rotatably disposed or attached at the mirror head 12 so that movement or rotation of the actuator housing about the pivot axis of the pivot post 22 translates to movement or rotation of the mirror head 12. Thus, the motors 32 are actuated to pivot or rotate the actuator housing, and therefore mirror head 12, about the pivot axis. The motors 32 are actuated to rotatably drive a respective motor worm gear 32a that rotatably drives a respective main gear 32b, which engages the output gear 26 and rotates the housing relative to the output gear 26 until a hard stop is engaged, whereby the motor will stall or stop, with the mirror head 12 retained at the extended or drive position via detent elements or engagements or states of the actuator. The actuator 20 is configured such that a hard stop is provided at the appropriate locations when the mirror head 12 is pivoted via driving of the motor to position the mirror head as desired, such as at the folded position and at the use position.

Figure 7:
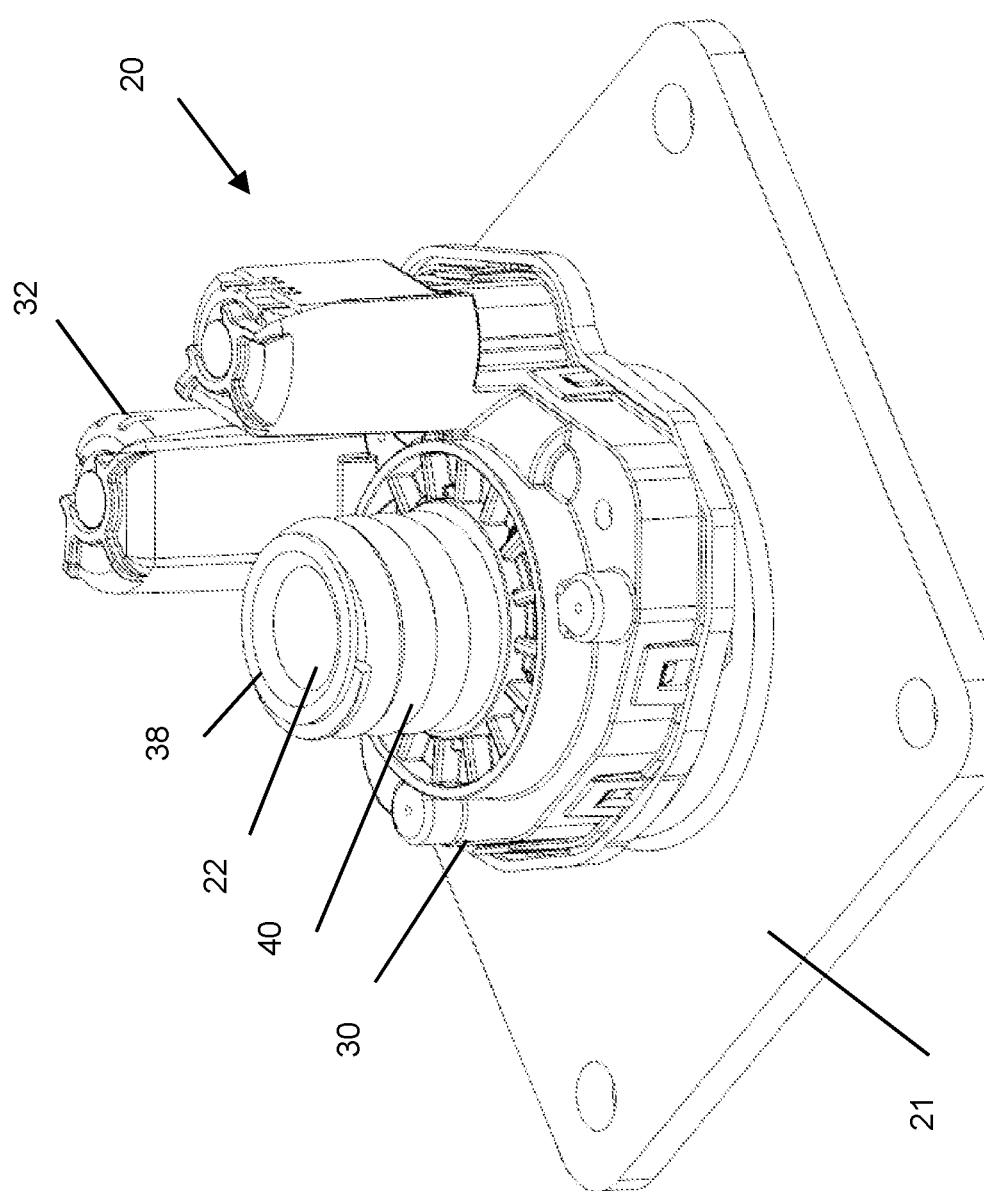
FIG. 7 is an upper perspective view of the powerfold actuator.
Figure 11:
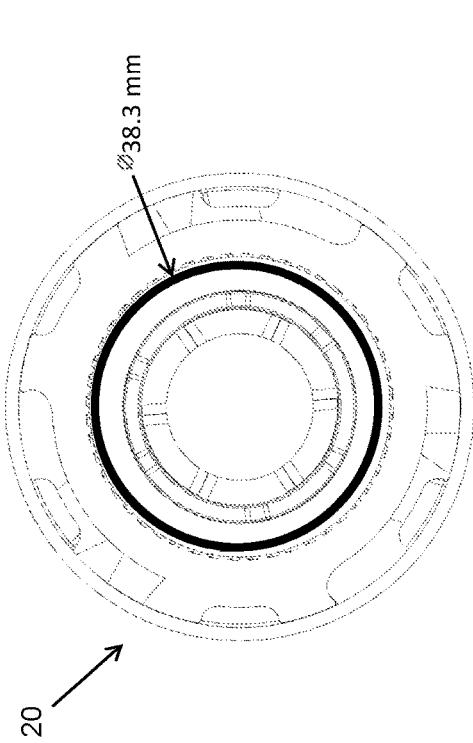
FIG. 11 is a top plan view of a portion of the powerfold actuator of FIG. 10.

The post 22 extends from the base 21 and through the lower detent 24 and the output gear 26. The lower detent may be disposed between the lower housing 28 and the base 21 and engage the output gear 26 through an aperture of the lower housing 28. The post 22 further extends through an upper detent element 34 and an output gear bushing 36, with the output gear bushing 36 disposed between the output gear 26 and the upper housing 30. The upper housing portion 30 attaches to the lower housing 28 and encloses a portion of the post 22, the motors 32 and worm gears 32a and main gears 32b, the upper detent element 34, the output gear 26, the output gear bushing 36, and at least a portion of the lower detent 24. A retainer 38 is rigidly fastened to the post 22 or integrally formed as a flared end of the post (as shown in FIGS. 7-9), such that the retainer 38, post 22 and base 21 are effectively a single member or element and provide axial and rotational ground reference for all motions and forces. A spring or biasing element 40 is disposed between the retainer 38 and an upper surface of the upper housing 30 and urges or biases the actuator housing downward toward the output gear 26 and base 21. The spring 40 (or other suitable biasing or urging element) provides the primary load and exerts a downward force at the upper housing 30, to bias the actuator housing toward the lower detent 24 and the base 21, so that the actuator housing engages the base 21, via the output gear 26 and detent plate 24, during electric folding.

The output gear 26 and the lower detent plate 24 are keyed together and do not rotate or move relative to one another. The output gear 26 and lower detent 24 do not rotate relative to the post 22 during electric actuation of the actuator 20 via operation of the motors 32. The upper detent 34 is non-rotatably keyed or rotationally locked relative to the base 21 and the post 22 such that the upper detent 34 is non-rotatable relative to the post 22, but can move axially along the post. The upper and lower housing portions 28, 30 are attached to one another and pivot around the post 22 and are urged toward engagement with the upper detent 34 or output gear bushing 26 via the spring 40, as discussed below.

As can be seen with reference to FIGS. 10-18, the upper detent 34 is disposed radially inward of the output gear 26 and has an upper detent lip 34a that extends radially outward and engages an upper end 24a of the detent plate 24, with the upper detent lip 34a and the upper end 24a of the detent plate 24 being correspondingly formed with ramps to allow for pivotal and axial movement of the upper detent 34 relative to the detent plate 24. Thus, the upper end 24a of the detent plate 24 and the upper detent lip 34a of the upper detent 34 form a detent interface, where, when the ramps of the upper end 24a and the upper detent lip 34a are engaged and travel along one another (i.e., the detent plate and the upper detent rotate relative to one another), the detent plate 24 and upper detent 34 move axially along the pivot post 22 according to the engagement of the ramps. Similarly, the lower end 24b of the detent plate and the upper end 21a of the base 21 (see FIG. 13) are correspondingly formed with ramps to allow for pivotal and axial movement of the detent plate 24 relative to the base 21 when the mirror head is manually pivoted.

Thus, the detent plate 24 may move axially along the pivot post 22 relative to the base 21 according to the engagement of the ramps of the lower end 24b of the detent plate and the upper end 21a of the base when the detent plate 24 pivots relative to the base 21. The inside upper surface of the upper housing 30 may also have ramps/recesses that correspond with ramps/protrusions at the upper end of the upper detent 34 and thus the upper housing 30 and upper detent 34 may move axially relative to one another when one or both are pivoted, according to the engagement of the ramps of the inside upper surface of the upper housing 30 and the upper end of the upper detent 34. When the housing is assembled, the output gear 26 and output gear bushing 36 are housed partially within and between the upper housing 30 and lower housing 28, with the lower end 26a of the output gear 26 non-rotatably keyed to structure 24c at the detent plate 24, which allows for the output gear to move axially relative to the detent plate 24.

Figure 12:
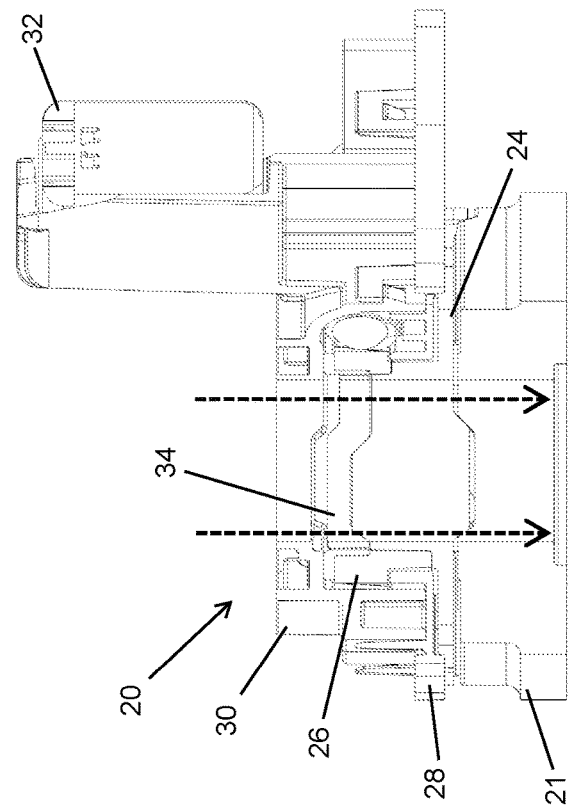
FIG. 12 is a side view of the powerfold actuator of FIG. 10.
Figure 10:
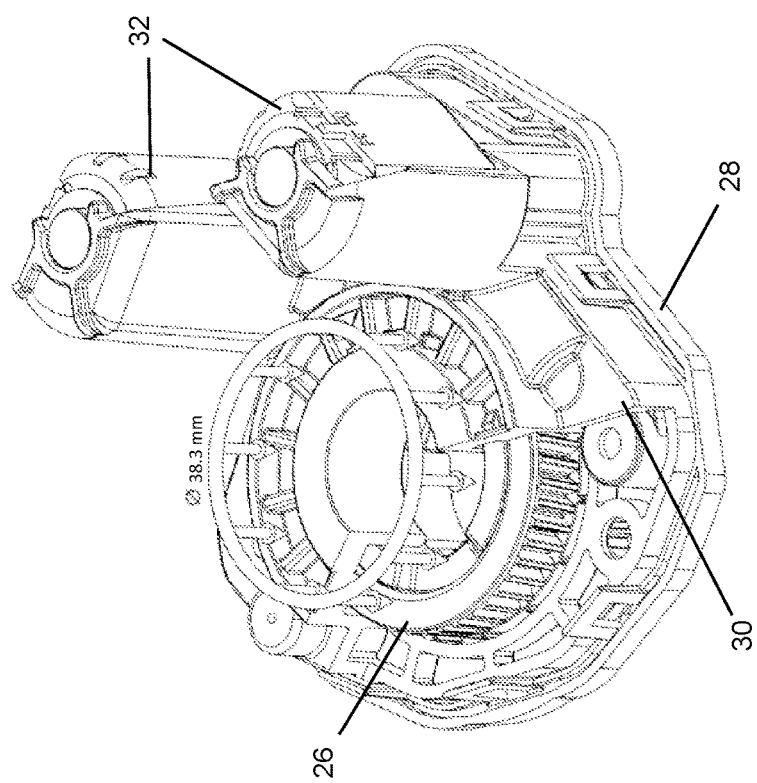
FIG. 10 is a perspective and partial sectional view of the powerfold actuator, showing the load path of the biasing force when the actuator is in its primary detent position.
Figure 15:
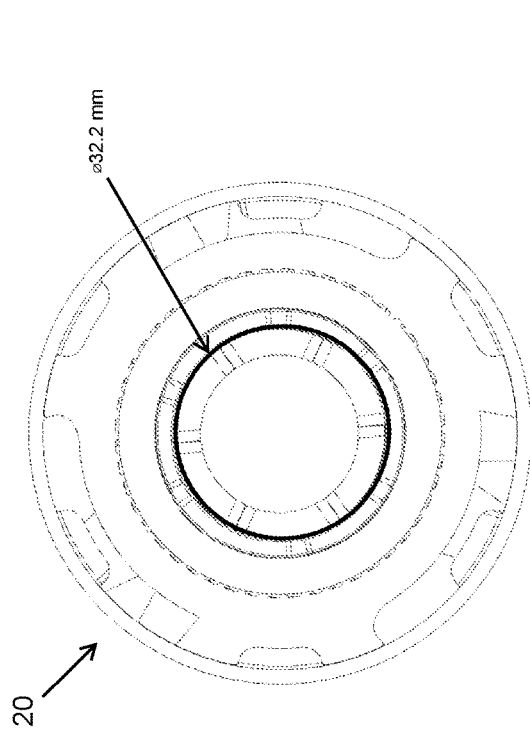
FIG. 15 is a top plan view of a portion of the powerfold actuator of FIG. 14.
Figure 16:
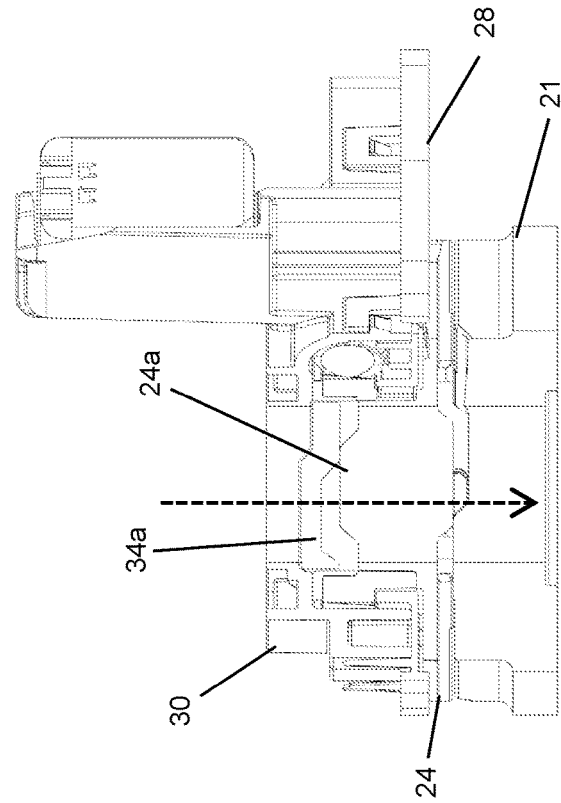
FIG. 16 is a side view of the powerfold actuator of FIG. 14.
Figure 14:
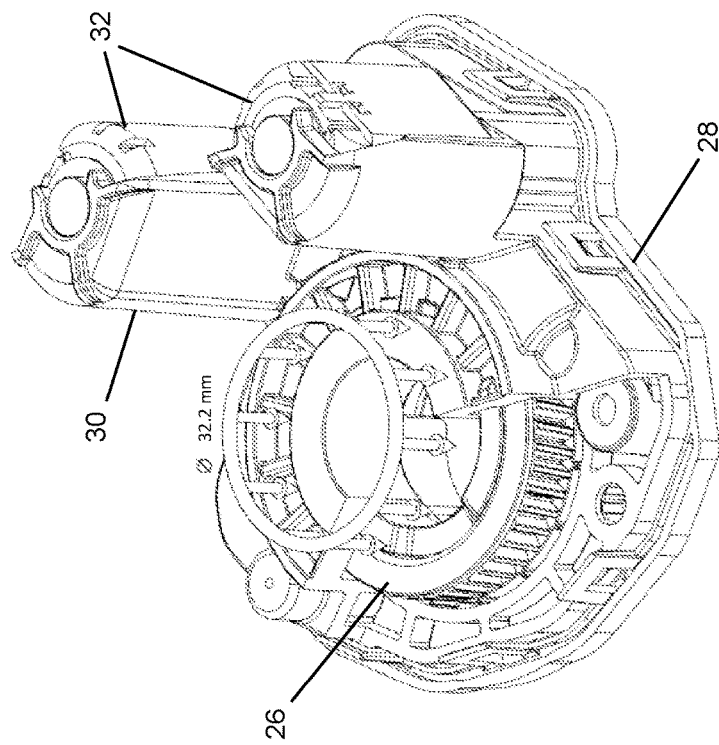
FIG. 14 is another perspective and partial sectional view of the powerfold actuator, showing the load path of the biasing force when the powerfold actuator is in its secondary detent position.

Thus, during operation, the actuator 20 is typically in the primary detent state (FIGS. 10-13), where the lower end 24b of the detent plate 24 is meshed or nested with the upper end 21a of the base 21 and with the upper end 24a of the detent plate 24 meshed or nested with the upper lip 34a of the upper detent 34 (see FIG. 12). The loading forces (exerted by the spring) thus are through the housing, the output gear bushing 36, the output gear 26 and the detent plate 24 to the base 21, with the upper detent 34 effectively floating within the actuator 20. During operation of the actuator 20 when in the primary detent state, the motors 32 drive the gears to move or pivot the mirror head (via rotating the housing about the output gear) about the pivot axis of the pivot tube 22, while the output gear 26 remains fixed at the pivot tube 22. As the housing and mirror head 12 are rotated from the use position toward the folded or park position, the housing lifts in relation to the base 21 while turning, and such lifting lifts the mirror head and increases the gap between the mirror head mounting portion 12a and the mounting base 18 and thus reduces or limits or avoids pressure at the cut line seal (the seal that is disposed between and at the interface of the mirror head mounting portion 12a and the mounting base 18 and that follows the contour and fills the gap between the mirror head 12 and the base 18) during pivotal movement of the mirror head 12.

When the mirror head 12 is manually pivoted (such as from a park position where the mirror actuator is in the primary detent state to a forward folded position), the actuator 20 can be set to the secondary detent state (FIGS. 14-17). As the mirror head 12 is manually pivoted from a position when in the primary detent state, the lower housing portion 28 and the output gear 26 are rotated while both the upper interface between the upper end 24a of the detent plate 24 and the lip 34a of the upper detent 34 is disengaged and the lower interface between the detent plate 24 and the base 21 is disengaged (see FIG. 18). During such manual pivoting of the mirror head 12, the mirror head 12 and actuator housing and output gear 26 and detent plate 24 all rotate together and in tandem about the pivot tube 22 relative to the base 21 (which is fixedly attached at the mirror mounting base or arm), resulting in the detent plate 24 rising upward along the ramps at the detent plate-base interface, which also raises the upper detent 34 into engagement with the upper housing 30 when the mirror head 12 arrives at the new (e.g., forward folded) position. The loading forces (exerted by the spring) that retain the mirror head in the new location or orientation thus are through the actuator housing, the upper detent 34 and the detent plate 24 to the base 21 when the actuator 20 is in the secondary detent state.

Figure 19:
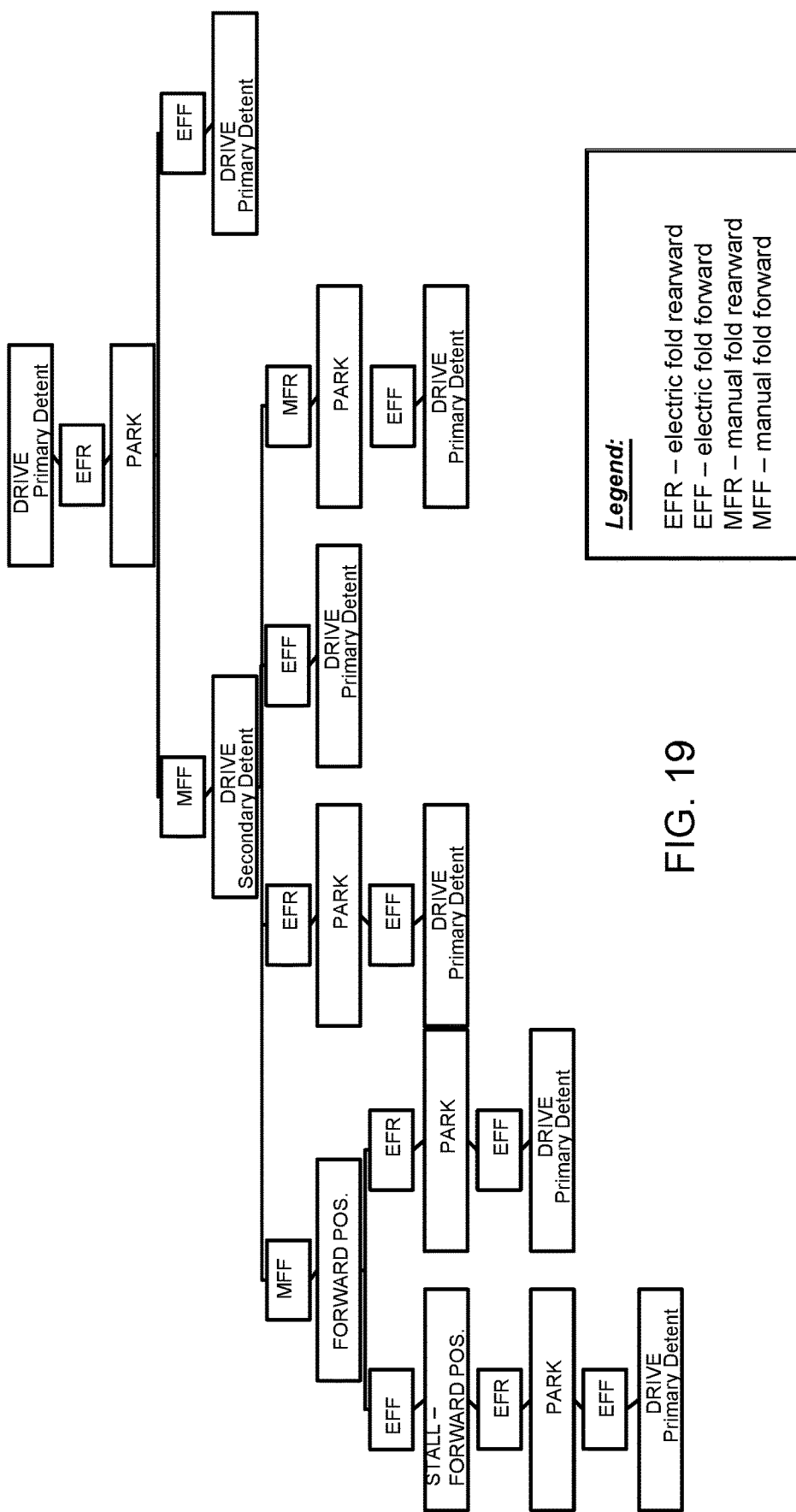
FIG. 19 is a block diagram showing operation of the powerfold actuator after the mirror head is electrically folded rearward from the drive position when in the primary detent state to the park position and then manually folded forward so as to be back in the drive position but in the secondary detent state.
Figure 20:
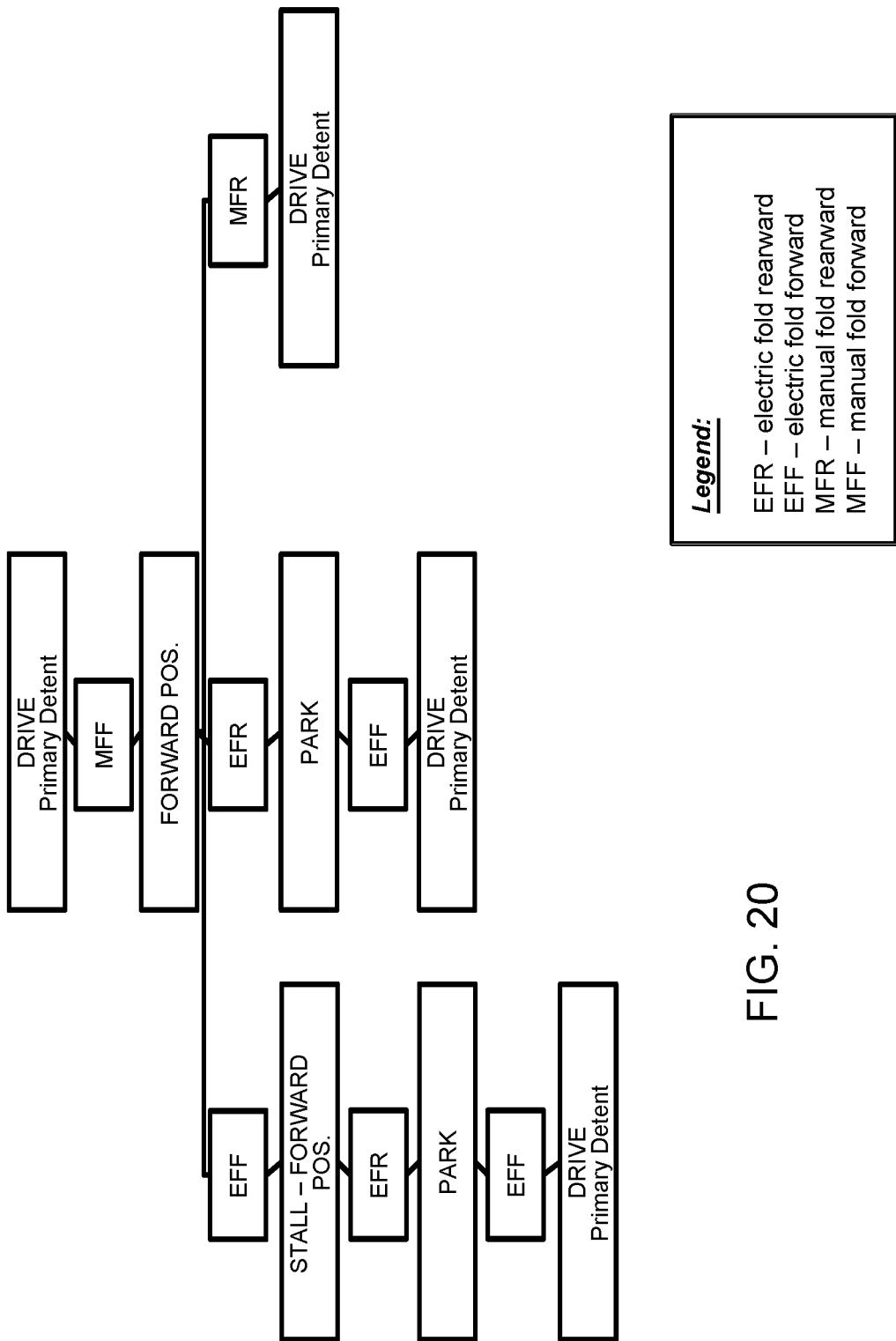
FIG. 20 is a block diagram showing operation of the powerfold actuator after the mirror head is manually folded forward from the drive position when in the primary detent state.
Figure 21:
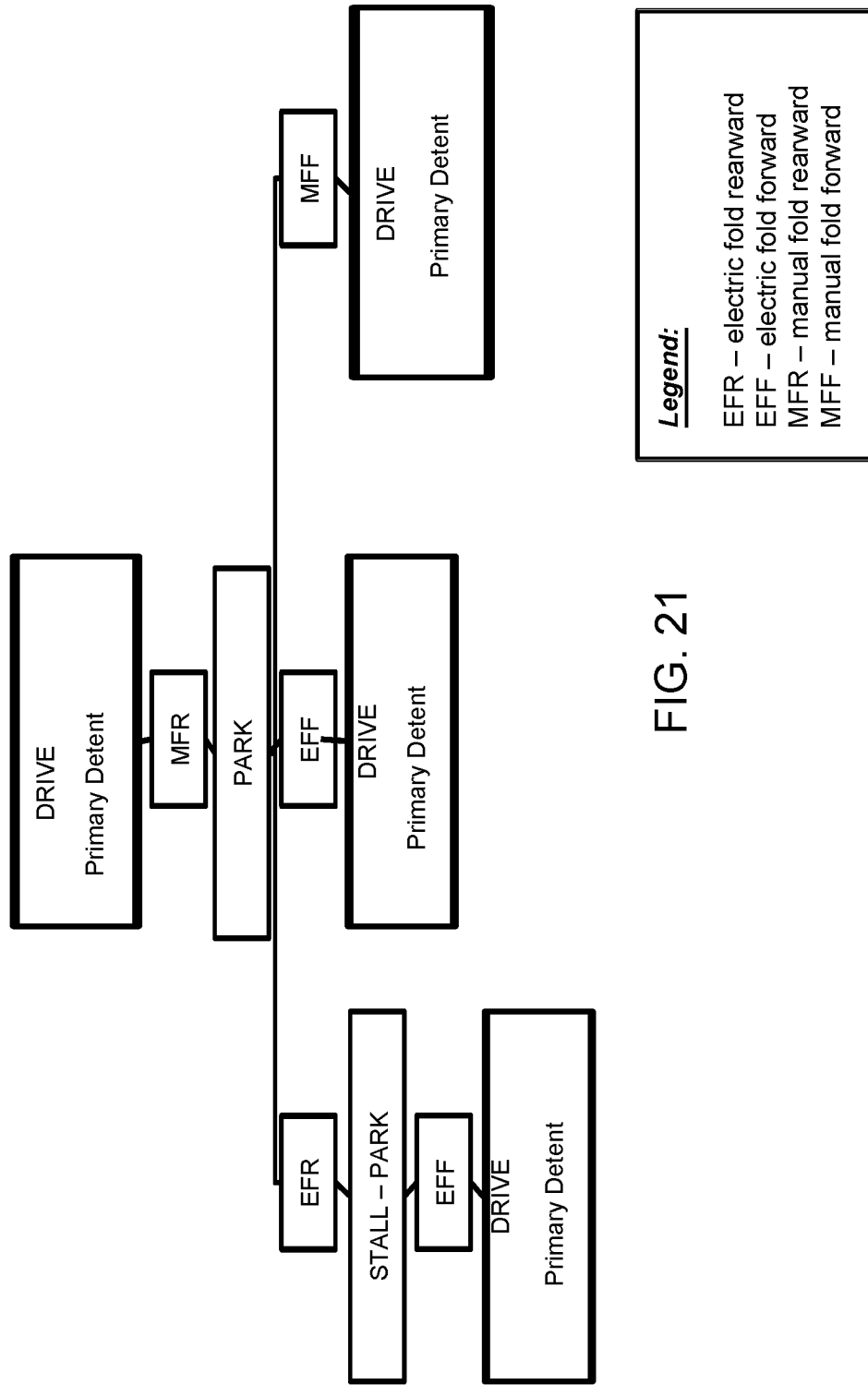
FIG. 21 is a block diagram showing operation of the powerfold actuator after the mirror head is manually folded rearward from the drive position when in the primary detent state.
Figure 22:
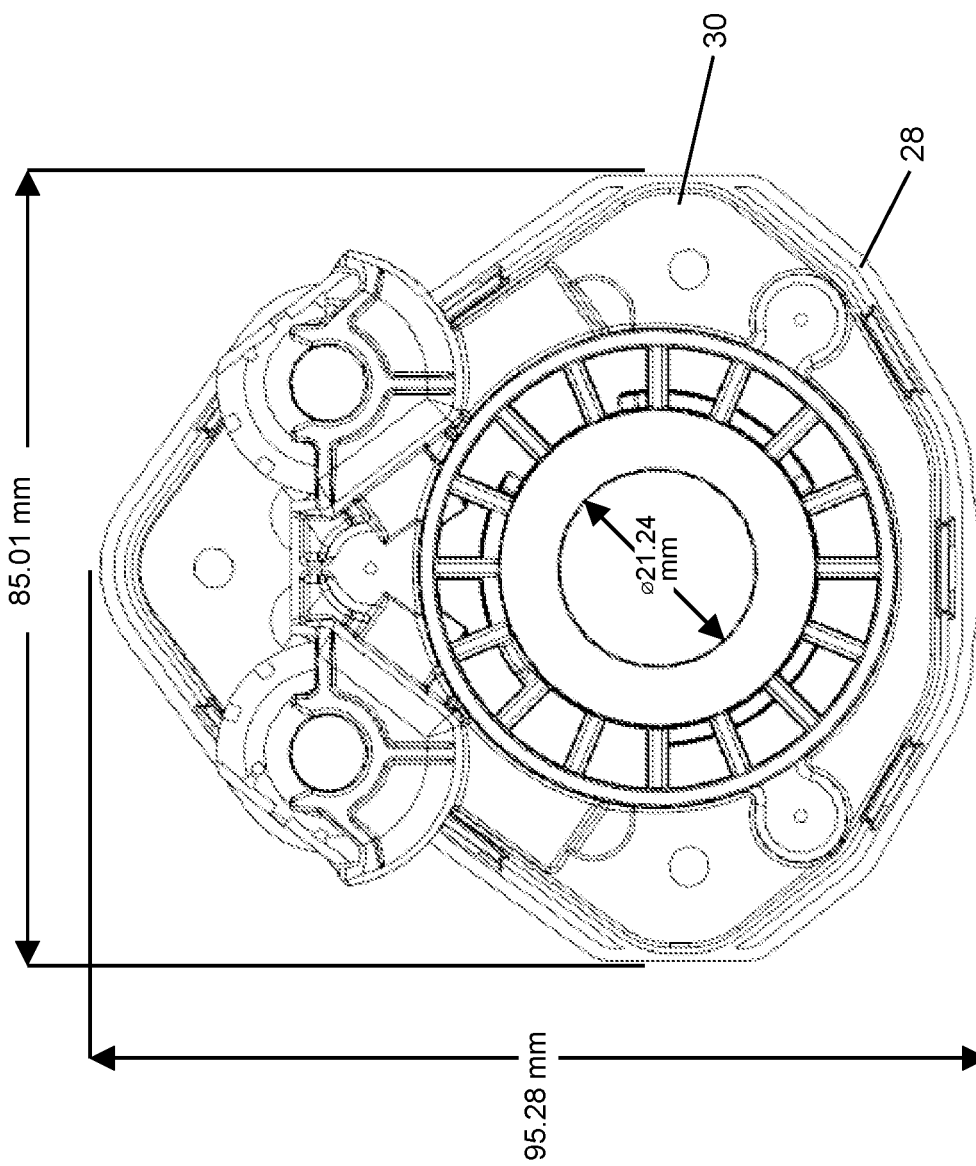
FIG. 22 is a top plan view of the powerfold actuator, showing exemplary dimensions.
Figure 23:
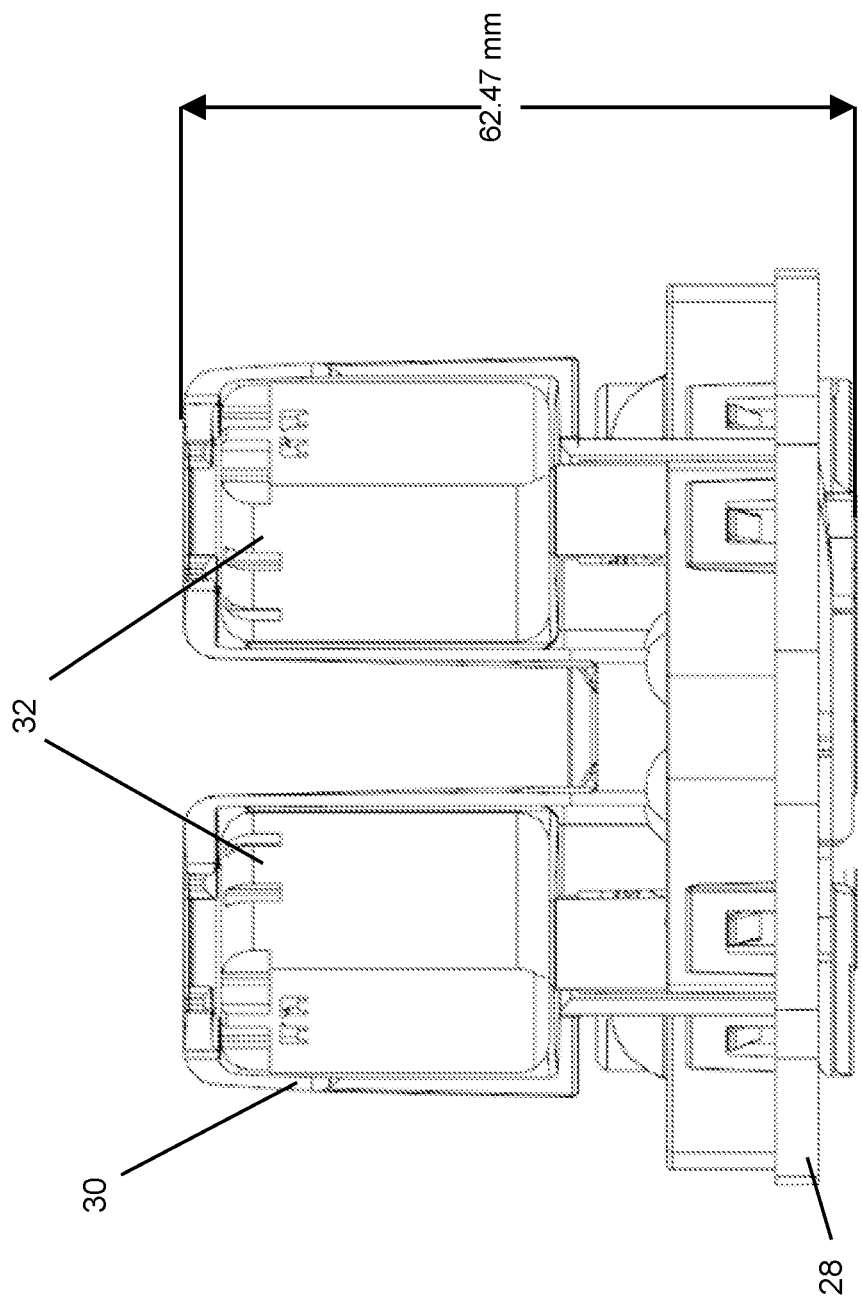
FIG. 23 is a side elevation of the powerfold actuator, showing exemplary dimensions.

As shown in FIGS. 19-21, the actuator 20 operates to return the state of the actuator to the primary detent state when the mirror head is manually pivoted to the secondary detent state. In other words, when the mirror head is manually pivoted, such as from the folded position to the drive position, the actuator is in the secondary detent state. When the actuator is in the secondary detent state, operation of the actuator may return the actuator to the primary detent state. FIGS. 19-21 show the different processes that return the mirror actuator to the primary detent state after the mirror head is pivoted from an initial position (in the primary detent state) to a new position forward or rearward of the initial position. For example, when the secondary detent retains the mirror head in the drive position (such as after manually folding the mirror head forward from the park position), subsequent powerfolding of the mirror head to the folded position and back to the drive position will cause the mirror head to be retained by the primary detent (see FIG. 19).

Thus, the mirror actuator has a double detent feature with an upper detent that is disposed radially inward of the output gear and the base plate. While this may reduce the pivot tube size, the pivot tube is dimensioned to provide sufficient strength for the actuator. Optionally, the diameter of the pivot tube may be increased, such as to provide added strength or to provide a passageway through the pivot tube, such as for electrical connectors or wiring for the exterior rearview mirror assembly. Although shown and described as having two motors that rotatably drive gears that engage different portions of the output gear, it is envisioned that aspects of the actuator are suitable to and applicable to a single motor actuator. In the illustrated embodiment, the motors are oriented vertically, with their output shafts and worm gears arranged vertically (parallel to the pivot axis of the pivot tube), which provides a dual motor actuator with a smaller profile or footprint compared to other dual motor actuators with the motors arranged horizontally.

Exterior mirror heads are getting larger, with more mass and wind load than the current actuators may be designed for, and the exterior mirror heads have more electronic content, requiring larger wire harness and more electrical connectors to feed through the pivot tube. The mirror actuator has a sufficiently large passageway through and along the pivot tube for the wire harness, while also providing for double detent capability, which allows the exterior mirror head to always be in a detent state when in the drive position (thus maintaining the spring load through the actuator to maintain the mirror head in the drive position).

The actuator provides a powerfold feature for large trailer tow mirror applications that feature two motors, two gears and three stop pins. The actuator provides higher output torque and increased vibration stability and has higher self-locking in the drive position compared to conventional actuators. The actuator provides a heavy duty design for large SUVs and pickup truck applications, and may provide for a folding function for large extendable trailer-tow mirrors. The actuator may include an external shut off device.

The powerfold actuator thus has enhanced performance and capability (reduced noise, higher torque, lift and turn, double detent, and a larger pivot post hole), having two motors and a double detent function with two detent interfaces that become active at different times between primary and secondary detent states. In the primary detent state, the load path as exerted by the spring is through the housing, the output gear, the detent plate and the base, with the upper detent effectively floating and not engaged by the upper housing. In the secondary detent state, the load path as exerted by the spring is through the housing, the upper detent, the detent plate and the base, with the output gear effectively floating and not engaged by the upper housing. When the mirror head is manually rotated, the main or output gear and plate rotate relative to the rotationally fixed upper detent, which causes upper detent to rise into engagement with upper housing. Thus, when in the primary detent state, the load goes through the output gear, but when in the secondary detent state, the load goes through the upper detent.

The actuator thus provides detents to retain the mirror head at the use position or at the folded position. When the mirror head is in the drive position and in the primary detent state, a part of the upper detent surface of the detent plate is disposed at a correspondingly formed first recessed portion of the upper lip of the upper detent, while a part of the lower detent plate is received in a correspondingly formed recessed portion of an upper detent surface of the base. The secondary detent functions when the mirror is electrically folded into the park position and then manually folded back to the drive position. While both the upper and lower detents are active in the primary detent function (during powerfolding of the mirror head), only the lower detent interface is active in the secondary detent function. To return to the primary detent, the motors are operated to rotate the housing about the output gear until the upper end of the detent plate meshes or interfaces with the upper lip of the upper detent.

Thus, the mirror powerfold actuator has a secondary detent that engages when the primary detent disengages. The secondary detent is thus a separate and distinct detent from the primary detent. A single spring or biasing element or urging element provides the forces to retain the respective detents in place.

The actuator also provides relief at the cut line seal during pivoting of the mirror head. The coil spring applies load through the upper detent part, the output gear, and the lower housing when the mirror head is in the drive position (and retained there via the primary detent). When the mirror head is in the drive position, the housing is at a lower position and the cut line seal is compressed between the mirror head mounting portion and the mounting base. As the mirror head is pivoted toward the folded position, the housing lifts away from the cut line seal to increase the gap and to release pressure at the cut line seal. The mirror head thus lifts slightly to release pressure at the seal, so there are reduced forces at the seal during pivotal movement of mirror head.

Thus, the powerfold actuator provides a double detent feature incorporated with a double or two-motor powerfold actuator. The double detent feature is configured to be compatible with an increased diameter pivot tube, such as to provide added strength to the actuator assembly or to provide a passageway through the pivot tube. The double detent feature may be accomplished by adding only one additional part as compared to traditional actuators. The double detent feature can be compatible with other actuator configurations, such as an actuator with one motor or an actuator with a reduced diameter pivot tube.

Changes and modifications in the specifically described embodiments may be carried out without departing from the principles of the present invention, which is intended to be limited only by the scope of the appended claims as interpreted according to the principles of patent law.

The invention claimed is:

1. An exterior rearview mirror assembly for a vehicle, the exterior rearview mirror assembly comprising:
    a mirror head comprising a mirror reflective element;
    a mounting base configured for attachment at a side of a vehicle;
    wherein the mirror head is movable relative to the mounting base between at least an extended position, where the mirror head is extended outward from the side of the vehicle so that the mirror reflective element is positioned to provide a rearward view at the side of the vehicle to a driver of the vehicle, and a folded position, where the mirror head is moved inward from the extended position toward the side of the vehicle;
    a powerfold actuator electrically operated to move the mirror head relative to the mounting base between the folded position and the extended position;
    wherein the powerfold actuator comprises a base portion that attaches at the mounting base and a pivot tube extending from the base portion, and wherein the pivot tube extends through a lower detent of the powerfold actuator, an output gear of the powerfold actuator, an upper detent of the powerfold actuator, and a housing of the powerfold actuator, the housing comprising an upper housing portion and a lower housing portion;
    wherein the powerfold actuator comprises a biasing element disposed between the upper housing portion and an upper end of the pivot tube, the biasing element releasably retains the powerfold actuator in at least one detent state of the powerfold actuator;
    wherein the mirror head is attached at the housing of the powerfold actuator, and wherein the mirror head and the housing of the powerfold actuator, when the powerfold actuator is electrically operated, move together and in tandem about a pivot axis of the pivot tube of the powerfold actuator;
    wherein the powerfold actuator comprises at least one electrically powered motor disposed in the housing, and wherein the at least one electrically powered motor, when electrically powered, rotatably drives a gear that engages the output gear to impart movement of the housing and the mirror head relative to the output gear;
    wherein the upper detent is disposed radially outboard of the pivot tube and radially inboard of the output gear and the lower detent, and wherein the upper detent includes a detent lip that engages an upper detent surface of the lower detent;
    wherein the upper detent is axially movable along the pivot axis of the pivot tube and non-rotatably engaged with the base portion;
    wherein the output gear is non-rotatably engaged with the lower detent and is axially movable along the pivot axis of the pivot tube;
    wherein the at least one detent state of the powerfold actuator comprises (i) a primary detent state and (ii) a secondary detent state;
    wherein the primary detent state is engaged to maintain the mirror head at the extended position when the mirror head is moved via the powerfold actuator to the extended position;
    wherein, when the powerfold actuator is in the primary detent state, a spring load path of the biasing element is through the output gear and the lower detent to the base portion;
    wherein, when the powerfold actuator is in the secondary detent state, the spring load path of the biasing element is through the detent lip of the upper detent and the lower detent to the base portion; and
    wherein, with the mirror head in the folded position, and when the mirror head is manually moved from the folded position to the extended position, the primary detent state is disengaged and the secondary detent state is engaged to releasably retain the mirror head at the extended position.

2. The exterior rearview mirror assembly of claim 1, wherein the detent lip of the upper detent has a lower detent surface that engages the upper detent surface of the lower detent, and wherein the detent lip includes an upper detent surface that engages an inner detent surface of the upper housing portion.

3. The exterior rearview mirror assembly of claim 2, wherein, when the powerfold actuator is in the primary detent state, the upper detent surface of the detent lip of the upper detent does not engage the inner detent surface of the upper housing portion.

4. The exterior rearview mirror assembly of claim 2, wherein, when the powerfold actuator is in the secondary detent state, the upper detent surface of the lower detent urges the upper detent upward against the inner detent surface of the upper housing portion.

5. The exterior rearview mirror assembly of claim 1, wherein, when the mirror head is manually moved, the output gear and the housing move together relative to the base portion.

6. The exterior rearview mirror assembly of claim 5, wherein, when the mirror head is manually moved, the housing and the output gear move axially along the pivot axis of the pivot tube relative to the base portion and the upper detent moves axially along the pivot axis of the pivot tube relative to the lower detent.

7. The exterior rearview mirror assembly of claim 1, wherein the at least one electrically powered motor comprises two electrically powered motors.

8. The exterior rearview mirror assembly of claim 1, wherein the at least one electrically powered motor is oriented with an output shaft of the at least one electrically powered motor parallel to the pivot axis of the pivot tube.

9. The exterior rearview mirror assembly of claim 8, wherein the at least one electrically powered motor comprises two electrically powered motors that are oriented with the output shafts parallel to the pivot axis of the pivot tube.

10. The exterior rearview mirror assembly of claim 1, comprising a seal disposed between the mirror head and the mounting base.

11. The exterior rearview mirror assembly of claim 1, wherein, when the mirror head is moved from the extended position toward the folded position, the housing of the powerfold actuator and the mirror head move axially along the pivot axis of the pivot tube away from the mounting base and the base portion of the powerfold actuator.

12. The exterior rearview mirror assembly of claim 1, wherein the biasing element applies a force at the upper housing from the upper end of the pivot tube.

13. An exterior rearview mirror assembly for a vehicle, the exterior rearview mirror assembly comprising:
 a mirror head comprising a mirror reflective element;
 a mounting base configured for attachment at a side of a vehicle;
 wherein the mirror head is movable relative to the mounting base between at least an extended position, where the mirror head is extended outward from the side of the vehicle so that the mirror reflective element is positioned to provide a rearward view at the side of the vehicle to a driver of the vehicle, and a folded position, where the mirror head is moved inward from the extended position toward the side of the vehicle;
 a powerfold actuator electrically operated to move the mirror head relative to the mounting base between the folded position and the extended position;
 wherein the powerfold actuator comprises a base portion that attaches at the mounting base and a pivot tube extending from the base portion, and wherein the pivot tube extends through a lower detent of the powerfold actuator, an output gear of the powerfold actuator, an upper detent of the powerfold actuator, and a housing of the powerfold actuator, the housing comprising an upper housing portion and a lower housing portion;
 wherein the powerfold actuator comprises a biasing element disposed between the upper housing portion and an upper end of the pivot tube, the biasing element releasably retains the powerfold actuator in at least one detent state of the powerfold actuator;
 wherein the mirror head is attached at the housing of the powerfold actuator, and wherein the mirror head and the housing of the powerfold actuator, when the powerfold actuator is electrically operated, move together and in tandem about a pivot axis of the pivot tube of the powerfold actuator;
 wherein the powerfold actuator comprises two electrically powered motors disposed in the housing, and wherein the two electrically powered motors, when electrically powered, rotatably drive respective gears that engage the output gear to impart movement of the housing and the mirror head relative to the output gear;
 wherein the two electrically powered motors are oriented with respective output shafts of the two electrically powered motors parallel to the pivot axis of the pivot tube;
 wherein, when the mirror head is moved from the extended position toward the folded position, the housing of the powerfold actuator and the mirror head move axially along the pivot axis of the pivot tube away from the mounting base and the base portion of the powerfold actuator;
 wherein the upper detent is disposed radially outboard of the pivot tube and radially inboard of the output gear and the lower detent, and wherein the upper detent includes a detent lip that engages an upper detent surface of the lower detent;
 wherein the upper detent is axially movable along the pivot axis of the pivot tube and non-rotatably engaged with the base portion;
 wherein the output gear is non-rotatably engaged with the lower detent and is axially movable along the pivot axis of the pivot tube;
 wherein the at least one detent state of the powerfold actuator comprises (i) a primary detent state and (ii) a secondary detent state;
 wherein the primary detent state is engaged to maintain the mirror head at the extended position when the mirror head is moved via the powerfold actuator to the extended position;
 wherein, when the powerfold actuator is in the primary detent state, a spring load path of the biasing element is through the output gear and the lower detent to the base portion;
 wherein, when the powerfold actuator is in the secondary detent state, the spring load path of the biasing element is through the detent lip of the upper detent and the lower detent to the base portion;
 wherein, when the mirror head is manually moved, the output gear and the housing move together relative to the base portion; and
 wherein, with the mirror head in the folded position, and when the mirror head is manually moved from the folded position to the extended position, the primary detent state is disengaged and the secondary detent state is engaged to releasably retain the mirror head at the extended position.

14. The exterior rearview mirror assembly of claim 13, wherein the detent lip of the upper detent has a lower detent surface that engages the upper detent surface of the lower detent, and wherein the detent lip includes an upper detent surface that engages an inner detent surface of the upper housing portion.

15. The exterior rearview mirror assembly of claim 14, wherein, when the powerfold actuator is in the primary detent state, the upper detent surface of the detent lip of the upper detent does not engage the inner detent surface of the upper housing portion.

16. The exterior rearview mirror assembly of claim 14, wherein, when the powerfold actuator is in the secondary detent state, the upper detent surface of the lower detent urges the upper detent upward against the inner detent surface of the upper housing portion.

17. The exterior rearview mirror assembly of claim 13, wherein, when the mirror head is manually moved, the housing and the output gear move axially along the pivot axis of the pivot tube relative to the base portion and the upper detent moves axially along the pivot axis of the pivot tube relative to the lower detent.

18. The exterior rearview mirror assembly of claim 13, wherein the biasing element applies a force at the upper housing from the upper end of the pivot tube.

19. An exterior rearview mirror assembly for a vehicle, the exterior rearview mirror assembly comprising:
   a mirror head comprising a mirror reflective element;
   a mounting base configured for attachment at a side of a vehicle;
   wherein the mirror head is movable relative to the mounting base between at least an extended position, where the mirror head is extended outward from the side of the vehicle so that the mirror reflective element is positioned to provide a rearward view at the side of the vehicle to a driver of the vehicle, and a folded position, where the mirror head is moved inward from the extended position toward the side of the vehicle;
   a seal disposed between the mirror head and the mounting base;
   a powerfold actuator electrically operated to move the mirror head relative to the mounting base between the folded position and the extended position;
   wherein the powerfold actuator comprises a base portion that attaches at the mounting base and a pivot tube extending from the base portion, and wherein the pivot tube extends through a lower detent of the powerfold actuator, an output gear of the powerfold actuator, an upper detent of the powerfold actuator, and a housing of the powerfold actuator, the housing comprising an upper housing portion and a lower housing portion;
   wherein the powerfold actuator comprises a biasing element disposed between the upper housing portion and an upper end of the pivot tube, the biasing element releasably retains the powerfold actuator in at least one detent state of the powerfold actuator;
   wherein the mirror head is attached at the housing of the powerfold actuator, and wherein the mirror head and the housing of the powerfold actuator, when the powerfold actuator is electrically operated, move together and in tandem about a pivot axis of the pivot tube of the powerfold actuator;
   wherein, when the mirror head is moved from the extended position toward the folded position, the housing of the powerfold actuator and the mirror head move axially along the pivot axis of the pivot tube away from the mounting base and the base portion of the powerfold actuator to reduce pressure at the seal;
   wherein the powerfold actuator comprises at least one electrically powered motor disposed in the housing, and wherein the at least one electrically powered motor, when electrically powered, rotatably drives a gear that engages the output gear to impart movement of the housing and the mirror head relative to the output gear;
   wherein the upper detent is disposed radially outboard of the pivot tube and radially inboard of the output gear and the lower detent, and wherein the upper detent includes a detent lip that engages an upper detent surface of the lower detent;
   wherein the detent lip of the upper detent has a lower detent surface that engages the upper detent surface of the lower detent, and wherein the detent lip includes an upper detent surface that engages an inner detent surface of the upper housing portion;
   wherein the upper detent is axially movable along the pivot axis of the pivot tube and non-rotatably engaged with the base portion;
   wherein the output gear is non-rotatably engaged with the lower detent and is axially movable along the pivot axis of the pivot tube;
   wherein the at least one detent state of the powerfold actuator comprises (i) a primary detent state and (ii) a secondary detent state;
   wherein the primary detent state is engaged to maintain the mirror head at the extended position when the mirror head is moved via the powerfold actuator to the extended position;
   wherein, when the powerfold actuator is in the primary detent state, a spring load path of the biasing element is through the output gear and the lower detent to the base portion;
   wherein, when the powerfold actuator is in the secondary detent state, the spring load path of the biasing element is through the detent lip of the upper detent and the lower detent to the base portion;
   wherein, when the mirror head is manually moved, the output gear and the housing move together relative to the base portion; and
   wherein, with the mirror head in the folded position, and when the mirror head is manually moved from the folded position to the extended position, the primary detent state is disengaged and the secondary detent state is engaged to releasably retain the mirror head at the extended position.

20. The exterior rearview mirror assembly of claim 19, wherein, when the powerfold actuator is in the primary detent state, the upper detent surface of the detent lip of the upper detent does not engage the inner detent surface of the upper housing portion.

21. The exterior rearview mirror assembly of claim 19, wherein, when the powerfold actuator is in the secondary detent state, the upper detent surface of the lower detent urges the upper detent upward against the inner detent surface of the upper housing portion.

22. The exterior rearview mirror assembly of claim 19, wherein, when the mirror head is manually moved, the housing and the output gear move axially along the pivot axis of the pivot tube relative to the base portion and the upper detent moves axially along the pivot axis of the pivot tube relative to the lower detent.

23. The exterior rearview mirror assembly of claim 19, wherein the at least one electrically powered motor is oriented with an output shaft of the at least one electrically powered motor parallel to the pivot axis of the pivot tube.

24. The exterior rearview mirror assembly of claim 19, wherein the biasing element applies a force at the upper housing from the upper end of the pivot tube.

\* \* \* \* \*